United States Patent Office 3,378,440
Patented Apr. 16, 1968

3,378,440
METHOD FOR TREATING UROLOGICAL DISORDERS WITH A SILICONE COMPOSITION
Robert L. Rowan and Yetta Rowan, both of 33 E. 30th St., New York, N.Y. 10016
No Drawing. Continuation-in-part of application Ser. No. 247,286, Dec. 26, 1962. This application May 25, 1964, Ser. No. 370,086
1 Claim. (Cl. 167—55)

The present application is a continuation-in-part of our co-pending application Ser. No. 247,286, filed on Dec. 26, 1962, now U.S. Patent No. 3,239,414.

This invention relates to a method for treating the urological disorders by means of a therapeutic composition and more particularly by means of a silicone composition used to coat the interior walls of the human bladder and urethra.

It is a general object of this invention to provide a method for relieving an inflammation of the human bladder.

It is a more specific object of this invention to provide a method, whereby the walls of the human bladder and urethra are coated with a stable and chemically inert liquid and are thereby insulated from ambient internal irritating body fluids such as urine.

It is an other specific object of this invention to provide a novel coating for the urethra of a patient so as to provide a smooth surface in the urethra and thereby change the flow characteristics in the urethra of the patient from that favoring turbulent flow to that favoring laminar flow.

Still another object of this invention is to provide a new chemical for use in the treatment of bladder disorders based on a new and different mechanism of action as well as a previously unused drug in the human bladder.

Other objects of this invention will become apparent to those skilled in the art in the light of the following description.

In accordance with this invention the claimed method and coating used as a therapeutic composition a liquid having as an ingredient an organo-silicone oxide polymer (also referred to as organo-polysiloxane). These liquids are also popularly called silicones.

It is known that organopolysiloxanes are generally insoluble liquids. In order for a liquid to be adapted for internal use such as a coating agent for the human bladder the liquid must, however, have several other chemical, physical and physiological properties. For instance, such a liquid should have great thermal and oxidative stability. The liquid should be chemically inert with the human body fluids. It should also have a low volatility.

It has been found that certain organopolysiloxanes and in particular dimethylpolysiloxane, methylphenolpolysiloxane and copolymers of dimethylpolysiloxane and methylphenylsiloxane liquids, also methylpolysiloxane (what is meant here by methylpolysiloxane is a polymer of the type

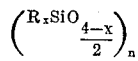

in which $x$ may have a value between 1 and 2 and where the numerical value of $n$ determines the length of the chain and thereby the viscosity of the liquid, and where R is a $CH_3$ radical) and diethylpolysiloxane when specially separately prepared and or combined with the forgoing siloxane polymers have all of the aforementioned desirable properties. The aforementioned liquids are generally clear and colorless. They can be sterilized repeatedly without significantly changing their physical or chemical properties. Furthermore, studies have shown that the aforementioned liquids are, when applied within certain limits to the human bladder and urethra, completely nontoxic.

The general chemical formula of organopolysiloxanes can be represented as follows:

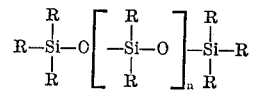

where R is a $CH_3$ or other organic radial and $n=0$ to 2000.

The chemical formula of the dimethylpolysiloxane liquids can be geenrally represented as follows:

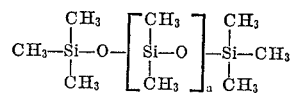

wherein the length $n$ of the polymer chain determines the viscosity of the liquid.

The chemical formula of the methylphenylpolysiloxane liquids can be generally represented as follows:

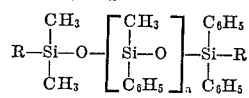

wherein the length $n$ of the polymer chain determines the viscosity of the liquid; it being understood that the end-blocking radicals R can be either $CH_3$ or $C_6H_5$.

The chemical formula of the copolymers of dimethylpolysiloxane and methylphenylpolysiloxane liquids can be generally represented as follows:

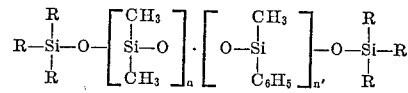

wherein the length $n$ of the dimethylpolysiloxane polymer chain and $n'$ the length of methylphenylpolysiloxane polymer chain determine the viscosity of the liquid; and where R is a $CH_3$ or $C_6H_5$ radical.

The chemical formula of diethylpolysiloxane liquids can be generally represented as follows:

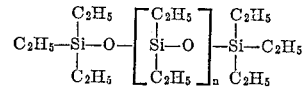

wherein the length $n$ of the polymer chain determines the viscosity of the liquid.

An inflammation in the human bladder or urethra is difficult to treat because the bladder and or urethra can not be put to rest as for instance the immobilizing of an injured extremity of a patient. It is therefore necessary to treat such an inflammation differently in order to avoid the constant irritation of the walls of the bladder and/or urethra by the urinary output of the body. Illustrative of such a condition is a patient suffering from idiopathic cystitis. In the latter case the urine of the patient carries causative material which not only irritates but increases the disease process. Similarly if the cause of the disease is inherent in the bladder wall, the exposure to the urine acts as an irritant.

While the anatomical arrangement of the urinary tract is normally constructed for laminar flow it has also been found that various pathological phenomena affect the wall of the urinary tract (e.g. gonorrhea) and transform the characteristics of the wall surface of the urethra so that the latter favors turbulent flow. Burning on urination is often aggravated by the roughening of the inflamed urethra mucosa. The latter, being sensitive due to pathological phenomena, favors turbulent flow rather than the normal laminar flow, thereby further aggravating the burning sensation.

It has been found that when introducing certain inert and non-toxic organopolysiloxane liquids into the bladder and urethra the liquid effectively coats the walls of the bladder and urethra and thereby acts as a barrier between the inflamed mucosa walls and the urine.

It has also been found that when introducing certain inert and non-toxic organopolysiloxane liquids into the roughened and inflamed urethra the liquid forms a smooth coating on the walls of the urethra thereby changing the surface characteristics thereof from those favoring turbulent flow to those favoring laminar flow.

The coating action of the aforementioned organopolysiloxane liquids is so effective because of their relatively low surface tension. For instance:

|  | Viscosity range, centistokes | Approx. surface tension ranges, dynes/centimeter |
|---|---|---|
| Dimethylpolysiloxane | 10–1,000 | 20–21.5 |
| Methylphenylpolysiloxane | 475–525 | 28.5 |
| Copolymer of methylphenylpolysiloxane and dimethylpolysiloxane | 500–1,000 | 24.4–24.7 |

When comparing this with the surface tension of water which is about 72 dynes/cm. it becomes apparent why these liquids have such a high surface activity and consequently are such effective coating agents in the bladder and urethra.

It has been found that the afore-listed organopolysiloxane liquids are particularly effective in relieving the undesirable symptoms of cystitis such as urinary frequency, bearing down sensations, burning on urination, etc. by protecting the mucosa walls from the irritative effects of the urine. This protective coating action is particularly effective in treating cases of cystitis and in cases following X-ray therapy to the bladder for cancer. It should be noted, however, that the silicone liquids are only meant to be used for relief of symptology and no claim is made that the claims set forth hereinafter define a coating and a method for treating the etiology of any of the aforementioned symptoms.

Examples of treating patients by the aforedescribed method and with a coating of one or more of the aforedescribed liquids are hereinafter given by way of illustration but not by way of limiting the claims set forth below to those examples alone.

Example 1

Sterile disposable equipment is used in order to preclude the need for washing the silicone liquid from the equipment after its use. The equipment therefore is meant to be discarded after using it only once. The patient is prepared for catheterization by the usual known sterile technique. A steril disposable urethral catheter with introducer is used to empty the bladder of urine. About ten to twenty cubic centimeters of dimethylpolysiloxane liquid having a viscosity range from 350–1000 centistokes is then instilled into the urethra and bladder forming thereby a coating of dimethylpolysiloxane therein.

Example 2

Sterile equipment is used in order to preclude the need for washing the silicone liquid from the equipment after its use. A sterile urethral syringe with an introducer neck is used to instill about ten to twenty cubic centimeters of dimethylpolysiloxane liquid, having a viscosity range from 350–1000 centistokes, into the urethra and bladder forming thereby a coating of dimethylpolysiloxane therein.

Example 3

Sterile equipment is used in order to preclude the need for washing the silicone fluid from the equipment after its use. A sterile urethral syringe with an introducer neck is used to instill about ten to twenty cubic centimeters of methylphenylpolysiloxane liquid having a viscosity range from 350–1000 centistokes, into the urethra and bladder forming thereby a coating of methylphenylpolysiloxane.

Example 4

Sterile equipment is used in order to preclude the need for washing the silicone liquid from the equipment after its use. A sterile urethral syringe with an introducer neck is used to instill about ten to twenty cubic centimeters of a liquid copolymer consisting of methylphenylpolysiloxane and dimethylpolysiloxane, having a viscosity range from 350–1000 centistokes, into the urethra and bladder forming thereby a coating of a liquid copolymer consisting of methylphenylpolysiloxane and dimethylpolysiloxane.

Example 5

Sterile equipment is used in order to preclude the need for washing the silicone liquid from the equipment after its use. A sterile urethral syringe with an introducer neck is used to instill about ten to twenty cubic centimeters of diethylpolysiloxane liquid, having a viscosity range from 350–1000 centistokes, into the urethra and bladder forming thereby a coating of diethylpolysiloxane therein.

Although a preferred example of the invention has been described, it will be understood that modifications may be made within the spirit and scope of the appended claim.

We now claim:

1. A method for treating bladder disorders, which comprises the step of introducing into the bladder of a patient via the urethra a non-toxic organopolysiloxane liquid polymer selected from the group of methylphenylpolysiloxane, diethylpolysiloxane, methylpolysiloxane and copolymers of at least two of the aforementioned organopolysiloxanes, said organopolysiloxane liquid polymer having a viscosity within the range of 350–1000 centistokes.

References Cited

UNITED STATES PATENTS 3,239,414   3/1966   Rowan _____ 167—50

ALBERT T. MEYERS, *Primary Examiner.*

J. S. LEVITT, S. ROSEN, *Examiners.*

L. B. RANDALL, *Assistant Examiner.*